(12) United States Patent
Flasko et al.

(10) Patent No.: US 8,442,995 B2
(45) Date of Patent: May 14, 2013

(54) SYSTEMS AND METHODS FOR CONTROLLING SUBSCRIBED ACCESS TO DATA

(75) Inventors: Elisa M. Flasko, Duvall, WA (US); Christian Liensberger, Bellevue, WA (US); Rene J. Bouw, Kirkland, WA (US); Adam D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 13/006,604

(22) Filed: Jan. 14, 2011

(65) Prior Publication Data

US 2012/0185509 A1    Jul. 19, 2012

(51) Int. Cl.
*G06F 7/00* (2006.01)
(52) U.S. Cl.
USPC ................ 707/781; 707/770; 707/769
(58) Field of Classification Search .......... 707/781, 707/770, 769, 714; 705/26.3, 26; 718/104, 718/1; 713/320; 380/44; 370/230, 259
See application file for complete search history.

(56) References Cited

U.S. PATENT DOCUMENTS

| | | | |
|---|---|---|---|
| 5,812,533 A * | 9/1998 | Cox et al. | 370/259 |
| 6,687,223 B1 * | 2/2004 | Sajadieh et al. | 370/230 |
| 7,805,436 B2 | 9/2010 | Richards et al. | |
| 2004/0260621 A1 * | 12/2004 | Foster et al. | 705/26 |
| 2005/0147246 A1 * | 7/2005 | Agrawal et al. | 380/44 |
| 2008/0270363 A1 | 10/2008 | Hunt et al. | |
| 2009/0006543 A1 | 1/2009 | Smit | |
| 2009/0282272 A1 * | 11/2009 | Bestgen et al. | 713/320 |
| 2010/0050171 A1 * | 2/2010 | Liang et al. | 718/1 |
| 2010/0153958 A1 * | 6/2010 | Richards et al. | 718/104 |
| 2010/0175103 A1 | 7/2010 | Walter et al. | |
| 2010/0223256 A1 | 9/2010 | Chalana et al. | |
| 2011/0055040 A1 * | 3/2011 | Foster et al. | 705/26.3 |
| 2012/0047125 A1 * | 2/2012 | Day et al. | 707/714 |

OTHER PUBLICATIONS

Speschka, "Working with Large Lists in SharePoint 2010", Oct. 27, 2009, (3 pages).
"Query Throttling and Indexing", Oct. 28, 2010 (Retrieved Date), (2 pages).
Mdoorji, "Exchange 2010 Throttling Policies", Jun. 22, 2010, (6 pages).
"Data throttling", Oct. 28, 2010 (Retrieved Date), (6 pages).

* cited by examiner

*Primary Examiner* — Le H Luu
(74) *Attorney, Agent, or Firm* — Workman Nydegger

(57) ABSTRACT

Embodiments are directed to providing a plurality of data provisioning tiers for datasets and to throttling access to dataset data based on the dataset's data provisioning tiers. In an embodiment, a computer system receives an input that specifies a maximum number of queries that a user is allowed to perform on a given dataset over a specified period of time. The computer system generates data provisioning tiers for the dataset based on the received input. Each data provisioning tier indicates a maximum number of queries that the user is allowed to perform on a given dataset over a specified period of time. The computer system also applies the generated data provisioning tiers to the dataset so that the user is limited to the maximum number of queries specified in the data provisioning tier.

20 Claims, 4 Drawing Sheets

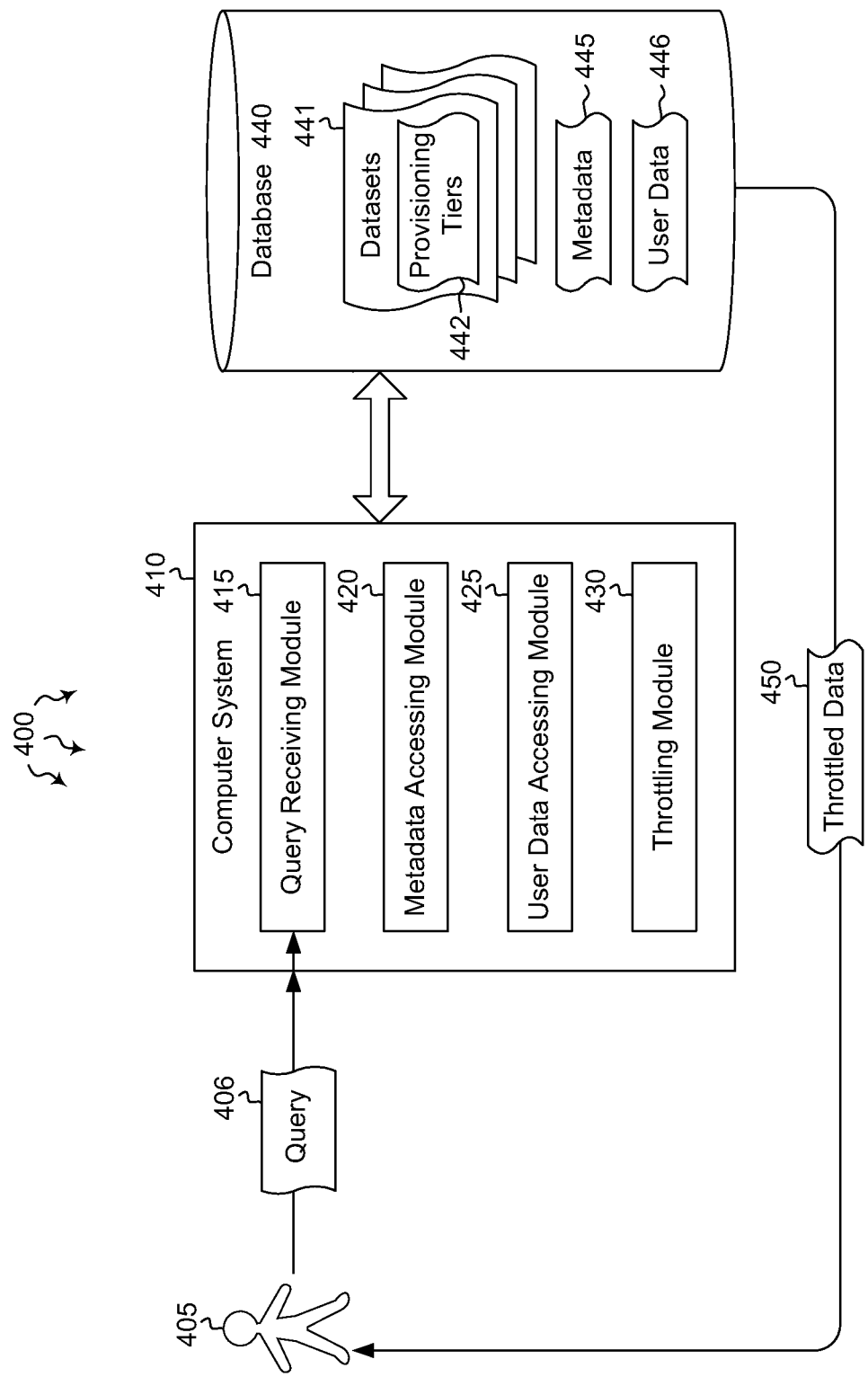

SYSTEMS AND METHODS FOR CONTROLLING SUBSCRIBED ACCESS TO DATA

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, an end-user's computer system may send queries to a database system to retrieve data from the database. The database system receives the query, accesses the data and sends the data to the user. In some cases, database providers may provide the data to the user free of charge. In other cases, the database provider (or the provider of the data served by the database) may wish to charge the user for the data provided. Determining an optimal method for charging different clients with different data needs may prove problematic.

BRIEF SUMMARY

Embodiments described herein are directed to providing a plurality of data provisioning tiers for datasets and to throttling access to dataset data based on the dataset's data provisioning tiers. In one embodiment, a computer system receives an input that specifies a maximum number of queries that a user is allowed to perform on a given dataset over a specified period of time. The computer system generates data provisioning tiers for the dataset based on the received input. Each data provisioning tier indicates a maximum number of queries that the user is allowed to perform on a given dataset over a specified period of time. The computer system also applies the generated data provisioning tiers to the dataset so that the user is limited to the maximum number of queries specified in the data provisioning tier.

In another embodiment, a computer system receives a query from a user for a specified dataset. The computer system accesses various portions of metadata about the dataset the user wants to access to determine which data provisioning tiers have been associated with the dataset. The computer system also accesses various portions of user data corresponding to the user to determine which data provisioning tiers the user is subscribed to. Based on the determined data provisioning tier, the computer system further determines that the received user query has exceeded the user's allowed maximum number of queries over a specified time period. Based on the further determination, the computer system throttles the received user query, so that the user has limited or no access to the dataset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates a computer architecture in which access to dataset data is throttled based on the dataset's data provisioning tiers.

DETAILED DESCRIPTION

Figure 1:
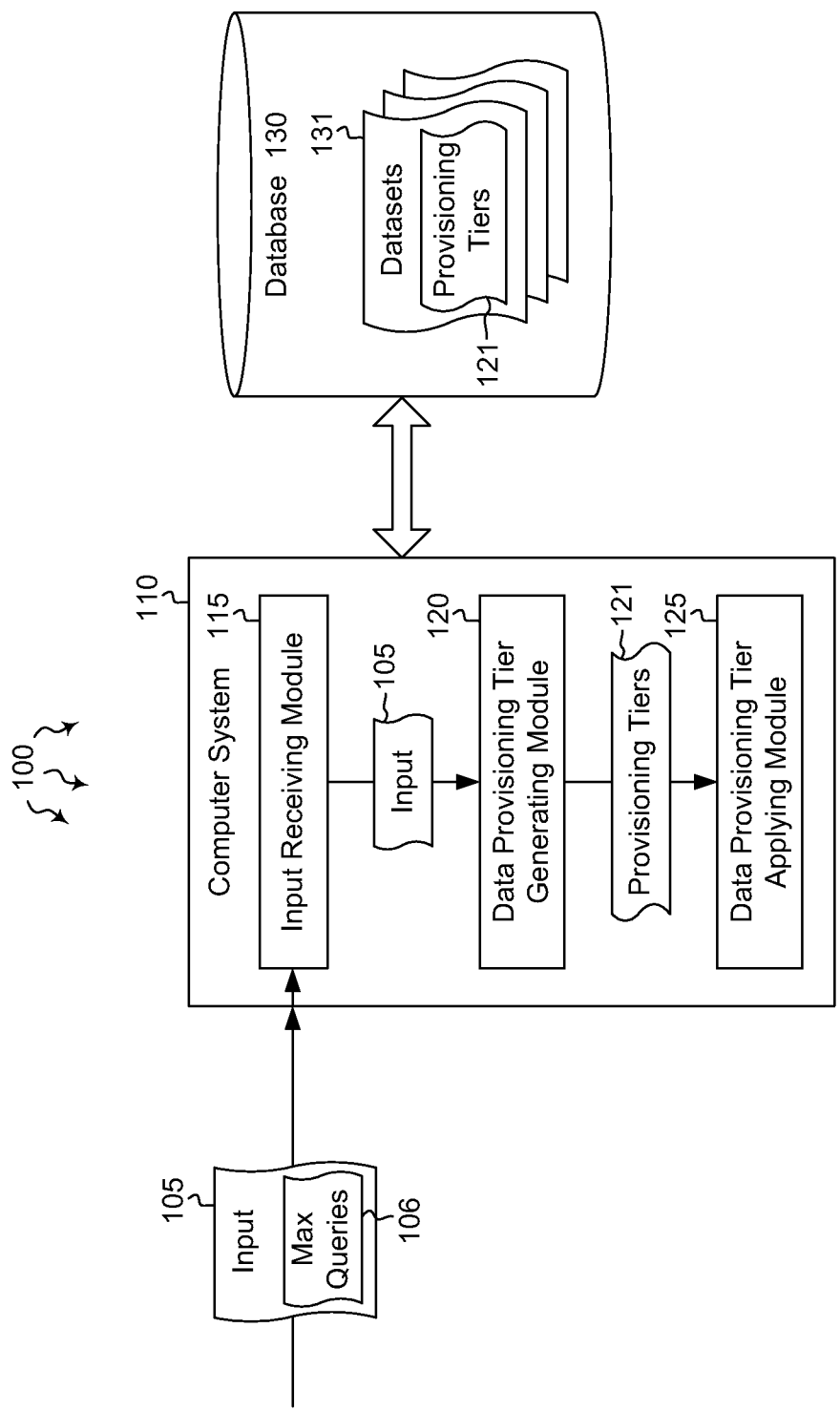
FIG. 1 illustrates a computer architecture in which embodiments of the present invention may operate including providing a plurality of data provisioning tiers for datasets and FIG. 2 illustrates a flowchart of an example method for providing a plurality of data provisioning tiers for datasets.

Embodiments described herein are directed to providing a plurality of data provisioning tiers for datasets and to throttling access to dataset data based on the dataset's data provisioning tiers. In one embodiment, a computer system receives an input that specifies a maximum number of queries that a user is allowed to perform on a given dataset over a specified period of time. The computer system generates data provisioning tiers for the dataset based on the received input. Each data provisioning tier indicates a maximum number of queries that the user is allowed to perform on a given dataset over a specified period of time. The computer system also applies the generated data provisioning tiers to the dataset so that the user is limited to the maximum number of queries specified in the data provisioning tier.

In another embodiment, a computer system receives a query from a user for a specified dataset. The computer system accesses various portions of metadata about the dataset the user wants to access to determine which data provisioning tiers have been associated with the dataset. The computer system also accesses various portions of user data corresponding to the user to determine which data provisioning tiers the user is subscribed to. Based on the determined data provisioning tier, the computer system further determines that the received user query has exceeded the user's allowed maximum number of queries over a specified time period. Based on the further determination, the computer system throttles the received user query, so that the user has limited or no access to the dataset.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of computer system including a distributed or cloud computing system. The computer system includes input receiving module 115 which is configured to receive inputs from users, software programs or other computer systems. For example, input receiving module 115 may receive input 105 which includes max queries indicator 106. The input 105 may then be sent to data provisioning tier generating module 120 (or "tier generating module 120" or "module 120" herein). Tier generating module 120 may be configured to generate various data provisioning tiers. Each tier may have different properties, configurations and settings. Each of the tiers may be used to provision data.

For example, data may be stored in a variety of datasets 131 in database 130. In some cases, each dataset may have its own provisioning tier 121 (as generated by module 120). Thus the data of each dataset may be provisioned or provided to users or other software programs according to the provisioning tier for that dataset. Alternatively, one provisioning tier may apply to multiple different datasets (e.g. those datasets belonging to a certain customer, or to a certain dataset category). The properties or settings of a provisioning tier may govern how the dataset is provisioned. For instance, the properties may indicate that a particular dataset has a data flow limit of X megabytes per second, where X is a variable number which has been determined for that dataset. Other settings may indicate a certain number of transactions that can be carried out on the dataset per period of time (e.g. second, minute, hour, day, week, month, year, etc.). Many other settings may be used in addition to those listed. These will be described in greater detail below.

Thus, the dataset data may be distributed according to the dataset's corresponding provisioning tier. In some cases, a customer or other user will have its own provisioning tier which controls that customer's access to the datasets 131 stored in database 130. In some cases, the input 105 from a user requesting a particular dataset may also specify the user's maximum number of allowed queries (e.g. 106) over a given time period. The computer system may check to verify that the user has not exceeded his or her maximum allowed queries (or transactions) for that time period. If the user has not exceeded his or her maximum allowed queries, the data provisioning tier applying module 125 will apply the provisioning tier 121 to the dataset and distribute the data to the user according to the provisioning tier.

In some cases, the owner of the data in a given dataset may indicate in the dataset's provisioning tier how the data is to be provisioned. The data owner may be able to create various datasets that each expose a subset of their database as an offer.

Two datasets may differ in the data that they expose, in the terms of use associated with the dataset, and/or in the cost of accessing the dataset. As the data owner creates a dataset he or she is able to specify an arbitrary number of queries for a specified price for each dataset (a "SKU"). Each SKU provides the customer with a specific number of allotted queries per time period. Users may purchase a specific SKU for a dataset, and computer system 110 programmatically throttles the users queries based on the allotted per time period identified in the SKU.

In some cases, each offering or dataset can specify two (or more) measures to throttle the end-user. These measures may be applied to each dataset in the system. As such, each offering (as seen by customers in the marketplace) can have multiple throttling mechanisms applied. When a customer subscribes to one dataset, the customer's usage is tracked by the provisioning tier. Throttling module 430 of FIG. 4 may determine how the user's data access is to be throttled. In some cases, if the user unsubscribes and then re-subscribes, the throttle may be reset.

The throttles are tracked on a subscribed offer base. In cases where a user has multiple accounts, each account may be separately tracked and throttled according to what the user has paid for. Each of the user's requests, regardless of which dataset is requested, may add to the same usage total, and may be throttled accordingly. In some cases, a monthly maximum is used. The monthly maximum specifies the maximum number of queries that can be executed against the dataset by a user or group of users (e.g. multiple users tied to one account) during a monthly period. After reaching the maximum number of transactions for the month, access to the subscribed dataset(s) is blocked for the remainder of the month. In other cases, other time periods may be used, such as maximum number of transactions per second, per minute, per hour, per day, per week, per year, or some other time period. Once the maximum number of transactions has been met for the time period, access to the subscribed dataset(s) is blocked for the remainder of that time period. These concepts will be explained in greater detail below.

Figure 2:
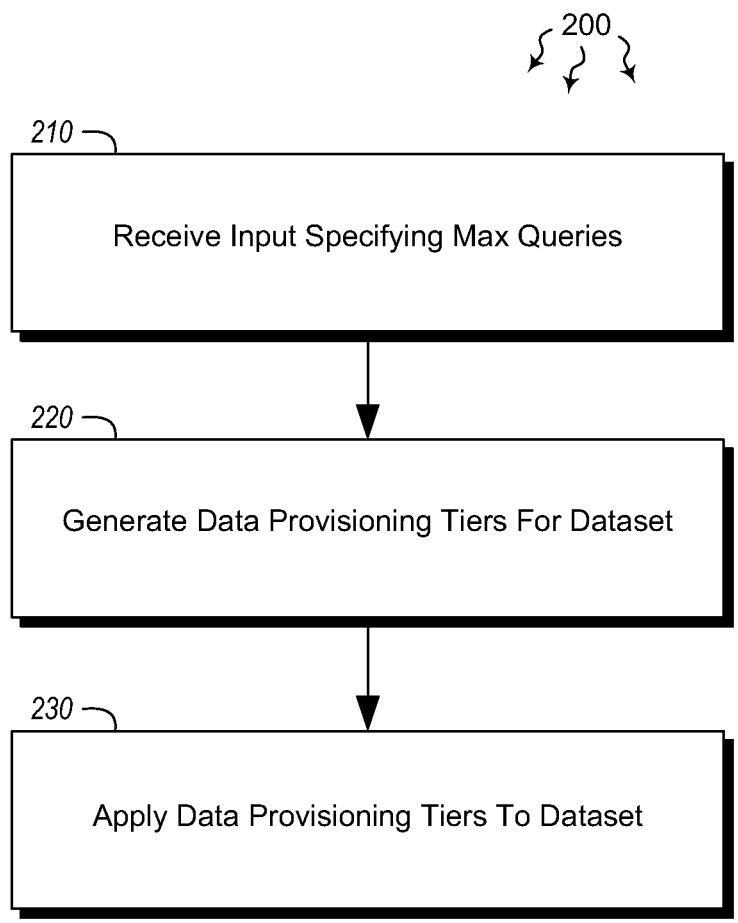
Figure 3:
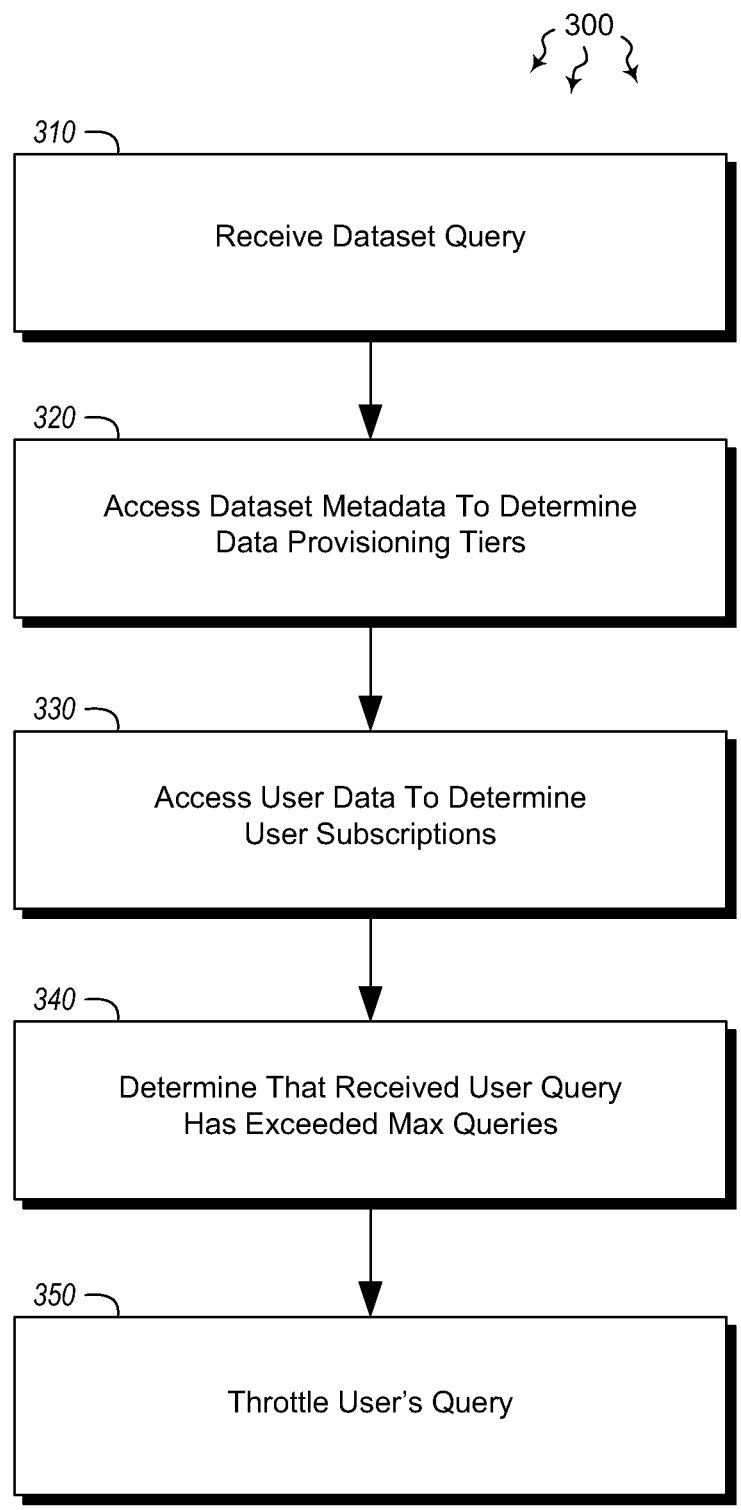
FIG. 3 illustrates a flowchart of an example method for throttling access to dataset data based on the dataset's data provisioning tiers.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a plurality of data provisioning tiers for datasets. The method 200 will now be described with frequent reference to the components and data of environment 100.

Method 200 includes an act of receiving an input that specifies a maximum number of queries that a user is allowed to perform on a given dataset over a specified period of time (act 210). For example, input receiving module 115 may receive input 105 which specifies a maximum number of queries 106 that a user is allowed to perform on dataset 131 over a specified period of time. The period of time may be determined by the user (customer) or by the data provider or data owner. In some cases, a user may purchase a specified number of queries or transactions (as one query may involve multiple transactions) for a specified price. The data provider or owner may offer multiple different subscriptions at different price points. The various subscriptions may offer more or fewer queries or transactions per time period, or may offer longer or shorter time periods.

Method 200 includes an act of generating one or more data provisioning tiers for the dataset based on the received input, such that each data provisioning tier indicates a maximum number of queries that the user is allowed to perform on a given dataset over a specified period of time (act 220). For example, data provisioning tier generating module 120 may generate data provisioning tier 121 for dataset 131 based on input 105. The generated provisioning tier indicates a maximum number of queries that the user is allowed to perform on the dataset over a specified time period.

In some cases, a user may subscribe to multiple datasets. The data provisioning tiers corresponding to each dataset govern the user's use of the datasets. Thus, a provisioning tier may apply to a user or group of users (i.e. the users may access any datasets to which they are subscribed). The data provisioning tier will provide access to the data depending on the user's or user group's subscription. Dataset subscriptions may be changeable during the specified period of time. As such, a user may upgrade or downgrade plans to include more or fewer transactions or to have a shorter or longer time period.

Accordingly, in some cases, a user may upgrade his or her dataset subscription to increase the maximum number of allowed queries. Similarly, a user may downgrade the dataset subscription to decrease the maximum number of allowed queries. As mentioned above, upgrading or downgrading subscriptions may (or may not) automatically reset the user's query count for the current time period. Some of the subscriptions may include a group of users that are allowed to send queries to the dataset and access dataset data. In some cases, two or more of the users in the group of users may have different query thresholds. In such cases, each of the two users is allowed a different maximum number of queries within the specified time period. In other cases, different types of users (e.g. end-user, administrator, etc.) may have different query thresholds. Accordingly, each of the user types may be allowed a different maximum number of queries within the specified time period.

Data provisioning tiers may further be differentiated by allowing subscriptions that covers users from a specified geographic region. Accordingly, users from the same town or city or from the same country or from the same building or building floor may share a subscription. In other cases, specific software applications may have their own or may share a subscription to a particular dataset. Thus, an application may be able to access a dataset in a predefined queries-per-period subscription. In still other cases, different data provisioning tiers or subscriptions may be provided for commercial and non-commercial entities. Many other provisioning tiers are possible for different users, entities, applications or other things that would access a dataset. Accordingly, those examples listed above should not be read as limiting the various types of data provisioning tiers.

Method 200 includes an act of applying the generated data provisioning tiers to the dataset, such that the user is limited to the maximum number of queries specified in the data provisioning tier (act 230). For example, data provisioning tier applying module 125 may apply the generated data provisioning tier 121 to dataset 131. Once the data provisioning tier has been applied to a given dataset, users are limited to their subscribed maximum number of queries for that dataset.

In some embodiments, a user may send a query and the computer system 110 may determine that the query has exceeded the maximum number of queries that the user is allowed to perform on the dataset over the specified period of time. Based on this determination, the computer system may throttle the user's access to the dataset in a specified manner. The throttling may include limiting at least one of the following: the number of queries, the number of transactions, and the amount of data transferred from the dataset. Using these (or other) throttling mechanisms, the data may be throttled in multiple different ways at the same time. The data may be throttled based on various customizable criteria including: user, user group, metadata about the user, type of user, prior usage data, the amount of data requested, the data that is returned, the location of the requester and the cost of computation. Data throttling will be explained further below with regard to method 300 of FIG. 3.

FIG. 3 illustrates a flowchart of a method 300 for throttling access to dataset data based on the dataset's data provisioning tiers. The method 300 will now be described with frequent reference to the components and data of environment 400 of FIG. 4.

Method 300 includes an act of receiving a query from a user for a specified dataset (act 310). For example, query receiving module 415 of computer system 410 may receive query 406 from user 405, where the query requests data from dataset 441. Database 440 may store a plurality of different datasets, each dataset including substantially any amount of data. The data may be stored locally or over a distributed storage system such as a storage area network (SAN) or on a cloud storage system. The database may also store metadata 445 related to the datasets and/or the provisioning tiers, as well as user data 446 corresponding to the various users that access the datasets 441.

Method 300 includes an act of accessing one or more portions of metadata about the dataset the user wants to access to determine which data provisioning tiers have been associated with the dataset (act 320). For example, metadata accessing module 420 may access metadata 445 about dataset 441 to determine which data provisioning tiers 442 have been associated with the dataset. The various provisioning tiers include settings which indicate which users are allowed to access the data and how often the users are allowed to access the data, per time period.

Method 300 includes an act of accessing one or more portions of user data corresponding to the user to determine which data provisioning tiers the user is subscribed to (act 330). For example, user data accessing module 425 may access user data 446 to determine whether the user is part of a group, how many times the user has accessed the data over a given time period and other useful user data.

Method 300 further includes, based on the determined data provisioning tier, an act of further determining that the received user query has exceeded the user's allowed maximum number of queries over a specified time period (act 340). For instance, once the appropriate provisioning tier is determined, the computer system 410 may determine, according to the user's subscription, that the query received from the user has exceeded the user's allowed maximum number of queries over the time period set in the subscription. Once the user (or user group, or user type, or application, etc.) has exceeded the maximum number of queries for that time period, the data will be throttled partially or completely.

In cases where a group of users is allocated a certain number of queries over a certain period of time, if any of those users exceeds the maximum number of queries (either for that individual group member or for the group as a whole), the group's data may be throttled. In some cases, the data may be throttled to the individual user who exceeded the maximum number of queries. In other cases, the data may be throttled to the entire group because the group as a whole exceeded their allotted number of queries for that period. As soon as the period expires (or contract changes are made), the user group's data will be transferred without any throttling.

Thus, method 300 includes, based on the further determination that the received user query has exceeded the user's allowed maximum number of queries over a specified time period, an act of throttling the received user query, such that the user has limited or no access to the dataset (act 350). For example, throttling module 430 may throttle the data that would be sent to the user in response to the user's query 406. Accordingly, the user may receive data at a lower bit rate or may receive a scaled-back portion of data (e.g. throttled data 450). Additionally or alternatively, the user's future queries may be limited or prevented altogether until the specified time period expires and the user's query count is reset.

In some cases, when a user sends a query that exceeds the user's allowed query amount, the user may be locked out of the system, so that the computer system 410 simply ignores requests from that user. This lockout period may be occur after some period of throttling, and is customizable. The lockout period and/or the throttle rate may be different for different users, different user groups, different user types, users located in different areas, or for other users based on other characteristics. In some embodiments, the dataset data may be formatted in a manner that makes data throttling more efficient. For instance, the data may be formatted so that data throttling may be applied in multiple different ways, perhaps at the same time. For example, the data may be formatted so that bit rate throttling and scaled-back data portions may both be used simultaneously.

Accordingly, methods, systems and computer program products are provided which provide data provisioning tiers for different datasets. The data provisioning tiers govern how data is provided to various different users. Moreover, methods, systems and computer program products are provided which throttle access to dataset data based on the dataset's data corresponding provisioning tier.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for providing a plurality of data provisioning tiers for one or more datasets, the method comprising:
   an act of receiving an input that specifies a maximum number of queries that a user is allowed to perform on a given dataset over a specified period of time;
   an act of generating one or more data provisioning tiers for the dataset based on the received input, such that each data provisioning tier indicates a maximum number of queries that the user is allowed to perform on a given dataset over a specified period of time; and
   an act of applying the generated data provisioning tiers to the dataset, such that the user is limited to the maximum number of queries specified in the data provisioning tier.

2. The method of claim 1, wherein the user subscribes to one or more datasets and wherein the one or more data provisioning tiers corresponding to the dataset govern the user's use of the datasets.

3. The method of claim 2, wherein dataset subscriptions are changeable during the specified period of time.

4. The method of claim 3, wherein the user performs at least one of the following: upgrades the dataset subscription to increase the maximum number of allowed queries or downgrades the dataset subscription to decrease the maximum number of allowed queries.

5. The method of claim 4, wherein upgrading subscriptions resets the user's query count.

6. The method of claim 3, wherein at least one of the subscriptions includes a group of users that are allowed to send queries to the dataset.

7. The method of claim 6, wherein at least two of the users in the group of users have different query thresholds, such that each of the two users is allowed a different maximum number of queries within the specified time period.

8. The method of claim 6, wherein at least two types of users in the group of users have different query thresholds, such that each of the two user types is allowed a different maximum number of queries within the specified time period.

9. The method of claim 3, wherein at least one of the subscriptions includes a data provisioning tier that covers users from a specified geographic region.

10. he method of claim 3, wherein at least one of the subscriptions includes a data provisioning tier that allows specified applications to subscribe to a specific data provisioning tier.

11. The method of claim 3, wherein different data provisioning tiers are provided for commercial and non-commercial entities.

12. The method of claim 1, further comprising:
an act of receiving a query from a user;
an act of determining that the query has exceeded the maximum number of queries that the user is allowed to perform on the dataset over the specified period of time; and
an act of throttling the user's access to the dataset.

13. The method of claim 12, wherein the throttling comprises limiting at least one of the following: the number of queries, the number of transactions, and the amount of data transferred from the dataset.

14. The method of claim 12, wherein the data is throttled based on one or more customizable criteria including: user, user group, metadata about the user, type of user, prior usage data, the amount of data requested, the data that is returned, the location of the requester and the cost of computation.

15. The method of claim 14, wherein multiple throttling mechanisms are applied to one dataset or user.

16. A computer program product for implementing a method for throttling access to dataset data based on the dataset's data provisioning tiers, the computer program product comprising one or more computer-readable storage device having stored thereon computer-executable instructions that, when executed by one or more processors of the computing system, cause the computing system to perform the method, the method comprising:
an act of receiving a query from a user for a specified dataset;
an act of accessing one or more portions of metadata about the dataset the user wants to access to determine which data provisioning tiers have been associated with the dataset;
an act of accessing one or more portions of user data corresponding to the user to determine which data provisioning tiers the user is subscribed to;
based on the determined data provisioning tier, an act of further determining that the received user query has exceeded the user's allowed maximum number of queries over a specified time period; and
based on the further determination, an act of throttling the received user query, such that the user has limited or no access to the dataset.

17. The computer program product of claim 16, wherein the dataset data is formatted in such a manner that data throttling is configurable for application in a plurality of ways.

18. The computer program product of claim 16, wherein a user's lockout period after throttling is customizable.

19. The computer program product of claim 18, wherein the lockout period is different for at least one of the following: different users, different user groups and different user types.

20. A computer system comprising the following:
one or more processors;
system memory;
one or more computer-readable storage media having stored thereon computer-executable instructions that, when executed by the one or more processors, causes the computing system to perform a method for providing a plurality of data provisioning tiers for one or more datasets, the method comprising the following:
an act of receiving an input that specifies a maximum number of queries that a user is allowed to perform on a given dataset over a specified period of time;
an act of generating one or more data provisioning tiers for the dataset based on the received input, such that each data provisioning tier indicates a maximum number of queries that the user is allowed to perform on a given dataset over a specified period of time; and
an act of applying the generated data provisioning tiers to the dataset, such that the user is limited to the maximum number of queries specified in the data provisioning tier.

* * * * *